April 5, 1960

H. L. BURNS 2,931,620

SEAL FOR BALANCED VALVE

Filed Feb. 1, 1956

INVENTOR.
HENRY L. BURNS
BY Woodling & Krost
Attys.

United States Patent Office 2,931,620
Patented Apr. 5, 1960

2,931,620

SEAL FOR BALANCED VALVE

Henry L. Burns, Portland, Oreg., assignor to Alar Products, Inc., a corporation of Ohio Application February 1, 1956, Serial No. 562,704

6 Claims. (Cl. 251—282)

My invention relates to balanced valves and particularly to the sealing arrangement in such balanced valves.

In the design of fluid flow and pressure regulating devices, it is advantageous to minimize the influence of variations in the supply pressure of the fluid. In case of a simple poppet-type valve, the supply pressure of the fluid entering the valve casing will load the valve seat in accordance with the pressure differential multiplied by the seating area of the valve.

In many uses of valves wherein good pressure regulation is required, it is necessary to counteract or minimize load variations. This is especially true of variations resulting from wide spreads in supply pressure or from large, high capacity valves. It is the practice in pressure regulator design to nullify or reduce load variations by using multi-stage regulation, correspondingly large controlled diaphragm areas, extended mechanical leverages and/or by balanced valves.

The present invention is directed to a balanced valve design for controlling or minimizing variations in the supply pressure of fluid entering the inlet of the valve casing. A balanced valve is one in which the inlet pressure forces, tending to move the valve in a valve seating direction, are counterbalanced by exposing a similar or other area in the opposite direction to the same inlet pressure, in other words, inlet pressure tends to open a valve as well as close a valve in a balanced valve construction. The valve may be completely balanced, in which case the opposite areas are arranged to equalize the biases imposed by the inlet pressure, or the balance may be partial, in which case the respective areas are proportioned to have the biases toward opening and closing actions in a desired proportion.

There are a number of valve balancing arrangements that have been used, but each of these has its limitations. In the use of double and opposing valve seats, there is presented problems of fabrication, accuracy and vulnerability of leakage through one or the other of the valve seats. In the use of a diaphragm or bellows opposite a valve seat to the outlet, there is a limitation in the allowable pressure range by reason of the limitations on the strength of the diaphragm or of the bellows material.

A balanced valve construction may have an opposing or balancing piston counteracting or opposing the valve action opening and closing the outlet. If the opposing or balancing piston is to be leak-tight, it requires a sealing means, such as an O-ring of rubber-like material. O-rings are well-known as having annular configurations and a round cross-section in an uncompressed condition. They are resiliently compressible and expand again to their normal shape when pressure is removed. In practice, the O-ring seals create variable and unpredictable load variation by reason of their slide friction and more so by their breakaway friction. The O-ring on the opposing or balancing piston of the balanced valve construction thus creates problems in imposing frictional resistances of varied nad unpredictable degrees to the operation of the opposing or balancing piston.

An object of my present invention is to provide an improved sealing arrangement for a balanced valve construction.

Another object is the provision of a seal for the opposing or balancing piston of a balanced valve construction in which the seal is compressed to allow valve displacement.

Another object is the provision of an arrangement of parts for providing an efficient seal between the piston and the casing of a balanced valve construction wherein a sealing engagement is maintained between the seal, the movable piston and the casing in which the piston reciprocates.

Another object is an improved sealing arrangement allowing retractions of the piston or valve body in a balanced valve while maintaining a seal between the piston and the seat of the seal.

Another object is the provision for eliminating sliding friction and breakaway friction in a seal between a reciprocating piston and the seat on the valve housing upon which the seal seats.

Another object is the provision for utilizing the resilient compressibiilty of the O-ring of rubber-like material for the sealing of the parts in the operation of the balanced valve construction.

Other objects and a fuller understanding of the invention may be had by referring to the following description and claims, taken in conjunction with the accompanying drawing, in which:

Figure 2:
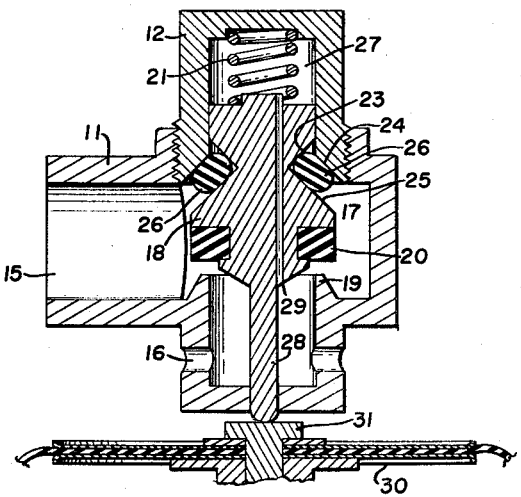
Figure 2 is a sectional view like that of Figure 1 but in which the valve is shown in an open position.
Figure 3:
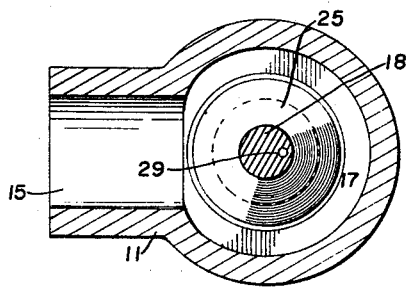
Figure 3 is a cross-sectional view of my valve construction taken through the line 3—3 of Figure 1.

In my valve construction there is a casing or housing 11 in which is located a reciprocal piston or valve body 18. A casing extension 12 is threadably connected to the casing proper 11 by means of the threaded connection 13 so that the extension 12 becomes a part of the housing 11. The casing 11 has an outlet portion 14 protruding from a side thereof opposite the casing extension 12. There is an inlet opening 15 through which fluid under pressure enters the casing into the internal chamber 17 within the casing. There are outlet openings 16 in the outlet portion 14 so that fluid may flow from the chamber 17 outwardly through the outlet openings 16 when the valve is in the opened condition shown in Figure 2.

There is a seat 19 of annular form which divides the chamber 17 from the outlet side of the valve leading to the outlet opening 16. This seat 19 has a raised annular edge extending up from the wall of the casing and the edge of the seat 19 is disposed in a flat plane and disposed to provide a seat for the valve seal 20, controlling flow to the outlet.

Prior to the threaded engagement of the casing extension 12 to the casing 11, the valve piston or body 18 is moved downwardly into the casing to the position shown in the drawing. A piston stem 28 extending from the one end of the piston 18 protrudes through an opening in the bottom wall of the outlet portion 14 and is movable in a sliding fit through this opening so that the piston may reciproctae between the positions shown in Figures 1 and 2.

Figure 1:
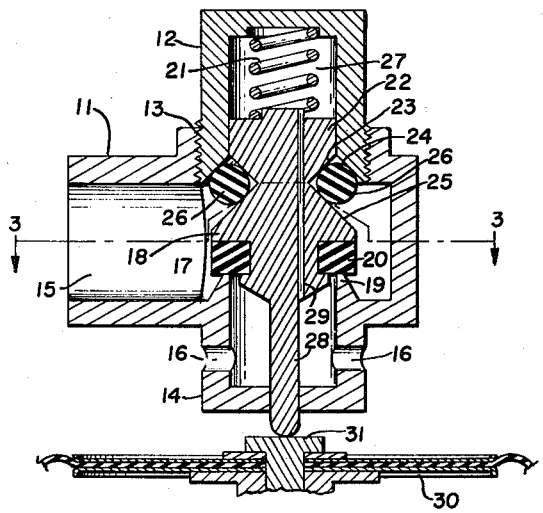
Figure 1 is a longitudinal sectional view of a balanced valve construction incorporating my invention and in which the valve is shown in a closed position.

If desired, a coil spring 21 may be positioned within the cavity 27 within the casing extension 12 so as to resiliently urge the piston 18 toward the seat 19 and to urge the piston stem 28 outwardly to protrude as shown in Figure 1. In other cases, the bias of the spring 21 may not be required and may be eliminated. The piston or valve body 18 has a head portion 22 which reciprocates within the cavity 27 of the casing extension 12 in a sliding fit. It is desired to form a good seal between the sliding head 22 and the wall of the casing, including the casing extension 12.

In my preferred arrangement, the piston or valve body has an annular groove formed therein for accommodating the O-ring 26 of resiliently compressible rubber-like material. The groove has two annular walls or surfaces 23 and 25. These surfaces 23 and 25 extend radially inwardly of the piston and meet at substantially a 90-degree angle to each other. The annular sealing surface 25 is disposed at a 45-degree angle to the axis of the piston 18 and the annular sealing surface 23 is disposed at a 45-degree angle to the same axis of the piston 18. As seen in the drawing, the surfaces are directed away from each other to form the groove therebetween. The casing, or more particularly the casing extension, has a sealing surface 24, which is also annular in form and is disposed at a 45-degree angle to the axis of the piston 18. The surface 24, as seen in cross-section, is substantially parallel to the surface 25. The space provided between the surfaces 23, 24 and 25 is substantially of square shape when seen in cross-section. The O-ring 26 is of such size as to firmly engage the three surfaces 23, 24 and 25 in a good sealing contact when the piston 18 is in the closed position shown in Figure 1. It is preferred that the O-ring 26 be under a slight compression when in this closed position of Figure 1 so as to assure a good sealing engagement between the O-ring and the three surfaces 23, 24 and 25. Preferably, the mean diameter of the O-ring 26 is equal to the diameter of the head 22 of the piston 18.

It is to be noted that when the piston or valve body 18 is in the closed position of Figure 1, the insert seal 20 firmly seats upon the seat 19 of the valve casing so that the outlet is closed. In this condition, the bias of fluid pressure within the internal chamber 17 is such as to urge the piston 18 both downwardly to a closed position and upwardly to an open position. In other words, the bias provided by the fluid pressure is counterbalanced so that the force tending to close the valve is balanced by a similar force tending to open the valve.

A duct or vent 29 is provided through the piston 18 to provide communication between the cavity 27 and the outlet side of the valve. If desired, the cavity 27 may be vented to another location in the system but in most instances it would be vented through the duct 29 to the outlet side as shown.

The piston 18 may be actuated either manually or mechanically in any of a number of ways. For purposes of simplicity, I have shown the piston 18 to be actuated by a pressure-sensitive diaphragm 30 which has a bearing portion 31 engaging the extreme end of the piston stem 28. Movement of the diaphragm 30 and its bearing portion 31 upwardly in Figure 1 raises the piston 18 to open valve outlet between the seat 19 and the insert seal 20. When this is done, the parts move to the position shown in Figure 2 and fluid within the internal chamber 17 flows out between the seal insert 20 and the valve seat 19 and thence out through the outlet opening 16. When the valve body or piston 18 is thus moved to the position shown in Figure 2, the O-ring 26 is resiliently compressed so that it has substantially the shape shown in Figure 2. It still maintains a good sealing engagement between the surfaces 23, 24 and 25. There is no frictional resistance or breakaway resistance as the O-ring 26 stays in the same position relative to the confining surfaces and merely changes its cross-sectional shape by reason of its resilient compressibility to allow the piston or valve body to move to the opening position shown in Figure 2.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A balanced valve assembly comprising in combination a cylindrical hollow body having an inlet and outlet and a valve seat positioned within said body, a valve piston movable axially of said body relative to said valve seat and having a sealing portion adapted to sealingly engage said valve seat upon axial movement of the valve piston to closed position and to disengage said valve seat upon axial movement of the valve piston to open position, said piston and valve seat controlling the flow of fluid through the body from said inlet to said outlet, said body at a distance from said valve seat having a cylindrical cavity axially aligned with said valve seat and said piston having a head portion retractible into said cavity upon movement of said piston to open position, said body having an internal sloping shoulder surrounding said cavity and said piston having an opposite sloping shoulder substantially parallel to and facing the said internal sloping shoulder of said body, and an annular seal of resilient rubber-like material carried by said piston between said sloping shoulder of the housing and the sloping shoulder of the piston, said seal being in sealing engagement with both said sloping shoulders in both the open and closed positions of said piston to maintain the seal to said cavity between the said piston head and the cylindrical wall to said cavity, said seal being resiliently compressible to allow said piston to move between closed position and open position while maintaining the sealing engagement of the seal with both said sloping shoulders, the resiliency of said seal in engagement with both said sloping shoulders resiliently biasing said piston into closed position.

2. A valve assembly as claimed in claim 1 and including a conduit through said piston for providing communication through the piston from said cavity to the said outlet in all positions of the piston in said body.

3. A valve assembly comprising a hollow valve body, a piston movable therein between open and closed position, said piston and body having slidably-engaging concentric cylindrical walls adjacent one end of the piston, said piston and body at an axial distance from said concentric cylindrical walls having cooperable valve seating parts adapted to control flow of fluid through the body from an inlet to an outlet thereof, said piston having an annular groove extending therearound and concentric with said piston, said housing having an annular shoulder concentric with said piston extending around said piston, said groove having a side facing in opposition to said shoulder, an annular seal of resilient rubber-like material disposed in said groove and extending radially outward of the piston to engage said shoulder, said seal being disposed in axial alignment with said concentric cylindrical walls of said piston and body and extending longitudinally of the piston sufficiently to maintain constant sealing engagement with both the said annular shoulder of the body and said side of the groove facing said shoulder in both open and closed position of the piston to effect a seal between said concentric cylindrical walls of the piston and body and simultaneously to bias resiliently the piston in a direction to urge the valve seating part of the piston relative to the valve seating part of the body to close the flow of fluid through the body from said inlet to said outlet.

4. A valve assembly as claimed in claim 3 and in which there is a confined space in said body closed by said piston and which confined space is variable in capacity as the piston moves in said body between said open and closed positions, and in which there is provided communication through the said piston between said confined space and the outlet of the body in both said open and closed positions of the piston.

5. In combination, a hollow body, a piston movable axially of itself in said body between open and closed positions, said piston and body having cooperable poppet-type valve parts for controlling flow of fluid through the body from an inlet to an outlet thereof, movement of the piston to open and closed positions actuating the said valve parts, said body at a distance from said valve parts having a cavity defined by the cylindrical wall of the body and a cylindrically-shaped head of the piston and into which the piston retracts in a sliding fit between said wall and head upon movement to open position, said piston having an annular groove extending therearound adjacent said piston head, said body having an annular shoulder extending therearound at the entrance to said cavity, said groove having a side disposed toward said shoulder, a resilient annular seal of circular cross-sectional contour disposed in said groove and extending radially outward from said piston to engage said shoulder, the projected cylinder coinciding with the said cylindrical wall of the body bisecting the cross-sectional area of said seal, said groove having a side facing and spaced from said shoulder, said seal being of a diameter in cross-sectional extent to engage simultaneously both said shoulder and said side of the groove in both the open and closed positions of the piston and being resiliently yieldable to accommodate movement of the piston and to urge the same to closed position.

6. The combination as claimed in claim 5, and in which said shoulder and said side of the shoulder are substantially parallel to each other and are inclined at acute angles to the axis of the piston radially inward and toward the said cavity.

References Cited in the file of this patent

UNITED STATES PATENTS

| 80,066 | Gibson | July 21, 1868 |
| 2,666,659 | Audemar | Jan. 19, 1954 |
| 2,476,519 | Van Der Werff | July 19, 1949 |

FOREIGN PATENTS

| 526,233 | France | of 1921 |
| 468,803 | Italy | of 1952 |